US010338903B2

(12) United States Patent
Leopoldseder et al.

(10) Patent No.: US 10,338,903 B2
(45) Date of Patent: Jul. 2, 2019

(54) SIMULATION-BASED CODE DUPLICATION

(71) Applicant: Oracle International Corporation, Redwood Shores, CA (US)

(72) Inventors: David Leopoldseder, Linz (AT); Thomas Wuerthinger, Zurich (CH); Lukas Stadler, Oberkappel (AT)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/927,852

(22) Filed: Mar. 21, 2018

(65) Prior Publication Data

US 2019/0012154 A1   Jan. 10, 2019

Related U.S. Application Data

(60) Provisional application No. 62/529,344, filed on Jul. 6, 2017.

(51) Int. Cl.
*G06F 8/41* (2018.01)
(52) U.S. Cl.
CPC .............. *G06F 8/4441* (2013.01); *G06F 8/41* (2013.01); *G06F 8/433* (2013.01); *G06F 8/443* (2013.01); *G06F 8/4435* (2013.01)
(58) Field of Classification Search
CPC ............. G06F 8/41; G06F 8/443; G06F 8/433
USPC ........................................ 717/156, 154, 140
See application file for complete search history.

(56) References Cited

U.S. PATENT DOCUMENTS

| 5,790,867 A * | 8/1998 | Schmidt ................. G06F 8/443 717/146 |
| 6,427,234 B1 * | 7/2002 | Chambers ........... G06F 9/45516 717/140 |
| 7,287,166 B1 * | 10/2007 | Chang ..................... G06F 21/54 713/176 |
| 8,046,751 B1 * | 10/2011 | Avadhanula ............ G06F 8/75 717/104 |

(Continued)

OTHER PUBLICATIONS

Ferrante et al., "The Program Dependence Graph and Its Use in Optimization" (Year: 1987).*

(Continued)

*Primary Examiner* — Phillip H Nguyen
(74) *Attorney, Agent, or Firm* — Ferguson Braswell Fraser Kubasta PC

(57) ABSTRACT

A method for analyzing a program may include generating an initial control flow graph (CFG) for the program, identifying merge blocks of the initial CFG, identifying predecessor-merge pairs based on identifying predecessor blocks for each merge block, simulating a duplication of each predecessor-merge pair, determining whether the duplication satisfies a precondition of each of a collection of optimizations, applying, in response to satisfying the precondition, the optimization to the duplication, and generating a simulation result for the predecessor-merge pair corresponding to the duplication. The simulation result may include the optimization and a benefit of applying the optimization to the duplication. The method may further include duplicating, in the initial CFG, a predecessor-merge pair based on the simulation result corresponding to the predecessor-merge pair.

20 Claims, 9 Drawing Sheets

(56) References Cited

U.S. PATENT DOCUMENTS

| | | | | |
|---|---|---|---|---|
| 8,826,255 | B1* | 9/2014 | Avadhanula | G06F 8/433 717/154 |
| 2004/0128659 | A1* | 7/2004 | Robison | G06F 8/4435 717/153 |
| 2006/0031686 | A1* | 2/2006 | Atallah | G06F 12/1408 713/190 |
| 2015/0149988 | A1* | 5/2015 | Nakaike | G06F 8/433 717/156 |

OTHER PUBLICATIONS

Edwards et al., "Code Generation in the Columbia Esterel Compiler" (Year: 2006).*
Rastislav Bodik et al., "Complete Removal of Redundant Expressions", PLDI '98 Proceedings of the ACM SIGPLAN 1998 Conference on Programming Language Design and Implementation, May 1998 (14 pages).
Pohua P. Chang et al., "Using Profile Information to Assist Classic Code Optimizations", Software—Practice & Experience, Dec. 1991 (33 pages)
Keith D. Cooper et al., "Compiler-Based Code-Improvement Techniques", Jan. 1998 (65 pages).
Ron Cytron et al., "Efficiently Computing Static Single Assignment Form and the Control Dependence Graph", ACM Transactions on Programming Languages and Systems, Oct. 1991 (40 pages).
Wen-mei W. Hwu et al., "The Superblock: An Effective Technique for VLIW and Superscalar Compilation", The Journal of Supercomputing, May 1993 (20 pages).
Scott A. Mahlke et al., "Effective Compiler Support for Predicated Execution Using the Hyperblock", Proceedings of the 25th Annual International Symposium on Microarchitecture MICRO 25, Dec. 1992 (10 pages).
E. Morel et al., "Global Optimization by Suppression of Partial Redundancies", Communications of the ACM, Feb. 1979 (8 pages).
Frank Mueller et al., "Avoiding Unconditional Jumps by Code Replication", PLDI '92 Proceedings of the ACM SIGPLAN 1992 Conference on Programming Language Design and Implementation, Jul. 1992 (9 pages).
Frank Mueller et al., "Avoiding Conditional Branches by Code Replication", PLDI '95 Proceedings of the ACM SIGPLAN 1995 Conference on Programming Language Design and Implementation, Jun. 1995 (11 pages).
Joseph A. Fisher, "Trace Scheduling: A Technique for Global Microcode Compaction", IEEE Transactions on Computers, Jul. 1981 (13 pages)

* cited by examiner

SIMULATION-BASED CODE DUPLICATION

CROSS-REFERENCE TO RELATED APPLICATIONS

This application claims benefit under 35 U.S.C. § 119(e) to U.S. Provisional Patent Application Ser. No. 62/529,344, filed on Jul. 6, 2017, and entitled "SIMULATION-BASED CODE DUPLICATION." U.S. Provisional Patent Application Ser. No. 62/529,344 is incorporated herein by reference in its entirety.

BACKGROUND

The scope of compiler optimizations is often limited by control flow, which prevents optimizations across basic block boundaries. Code duplication can solve this problem by extending basic block sizes, thus enabling subsequent optimizations. Code duplication is a compiler optimization that removes code after control merges and copies the removed code into predecessor blocks. Code duplication enables a compiler to specialize the duplicated code relative to the types and values used in predecessor branches. Code specialization can enable other optimizations. However, discovering optimization opportunities after code duplication is a non-trivial task. In addition, duplicating code for every optimization opportunity may result in excessive code growth.

Without global knowledge about the impact of duplication, a compiler may perform unnecessary (in teams of optimization potential) or even harmful (in terms of code size) transformations. Existing solutions primarily fall into two categories: 1) duplication without considering whether the duplication will enable specific optimizations, and 2) while applying a specific optimization, determining if duplication will expose an opportunity. Duplication approaches for very long word processors aims to increase basic blocks via tail duplication to enable the compiler to perform better instruction selection and scheduling. Duplication may be used to perform complete partial redundancy elimination, or to optimize away conditional and unconditional branches.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing a program including generating an initial control flow graph (CFG) for the program, identifying merge blocks of the initial CFG, identifying predecessor-merge pairs based on identifying predecessor blocks for each merge block, simulating a duplication of each predecessor-merge pair, determining whether the duplication satisfies a precondition of each of a collection of optimizations, applying, in response to satisfying the precondition, the optimization to the duplication, and generating a simulation result for the predecessor-merge pair corresponding to the duplication. The simulation result includes the optimization and a benefit of applying the optimization to the duplication. The method further includes duplicating, in the initial CFG, a predecessor-merge pair based on the simulation result corresponding to the predecessor-merge pair.

In general, in one aspect, one or more embodiments relate to a system including a repository configured to store a program, initial control flow graph (CFG), an optimized CFG, and simulation results, a memory coupled to a processor, and a simulator, executing on the processor and using the memory, configured to generate the initial CFG for the program, identify merge blocks of the initial CFG, identify predecessor-merge pairs based on identifying predecessor blocks for each merge block, simulate a duplication of each predecessor-merge pair, and duplicate, in the initial CFG, a predecessor-merge pair based on a simulation result corresponding to the predecessor-merge pair. The system further includes an optimizer, executing on the processor and using the memory, configured to determine whether the duplication satisfies a precondition of each of a collection of optimizations, apply, in response to satisfying the precondition, the optimization to the duplication, and generate the simulation result for the predecessor-merge pair corresponding to the duplication. The simulation result includes the optimization and a benefit of applying the optimization to the duplication.

In general, in one aspect, one or more embodiments relate to a non-transitory computer readable medium including instructions that, when executed by a processor, perform a method for analyzing a program, the method including generating an initial control flow graph (CFG) for the program, identifying merge blocks of the initial CFG, identifying predecessor-merge pairs based on identifying predecessor blocks for each merge block, simulating a duplication of each predecessor-merge pair, determining whether the duplication satisfies a precondition of each of a collection of optimizations, applying, in response to satisfying the precondition, the optimization to the duplication, and generating a simulation result for the predecessor-merge pair corresponding to the duplication. The simulation result includes the optimization and a benefit of applying the optimization to the duplication. The method further includes duplicating, in the initial CFG, a predecessor-merge pair based on the simulation result corresponding to the predecessor-merge pair.

Other aspects of the invention will be apparent from the following description and the appended claims.

DETAILED DESCRIPTION

Figure 1A:
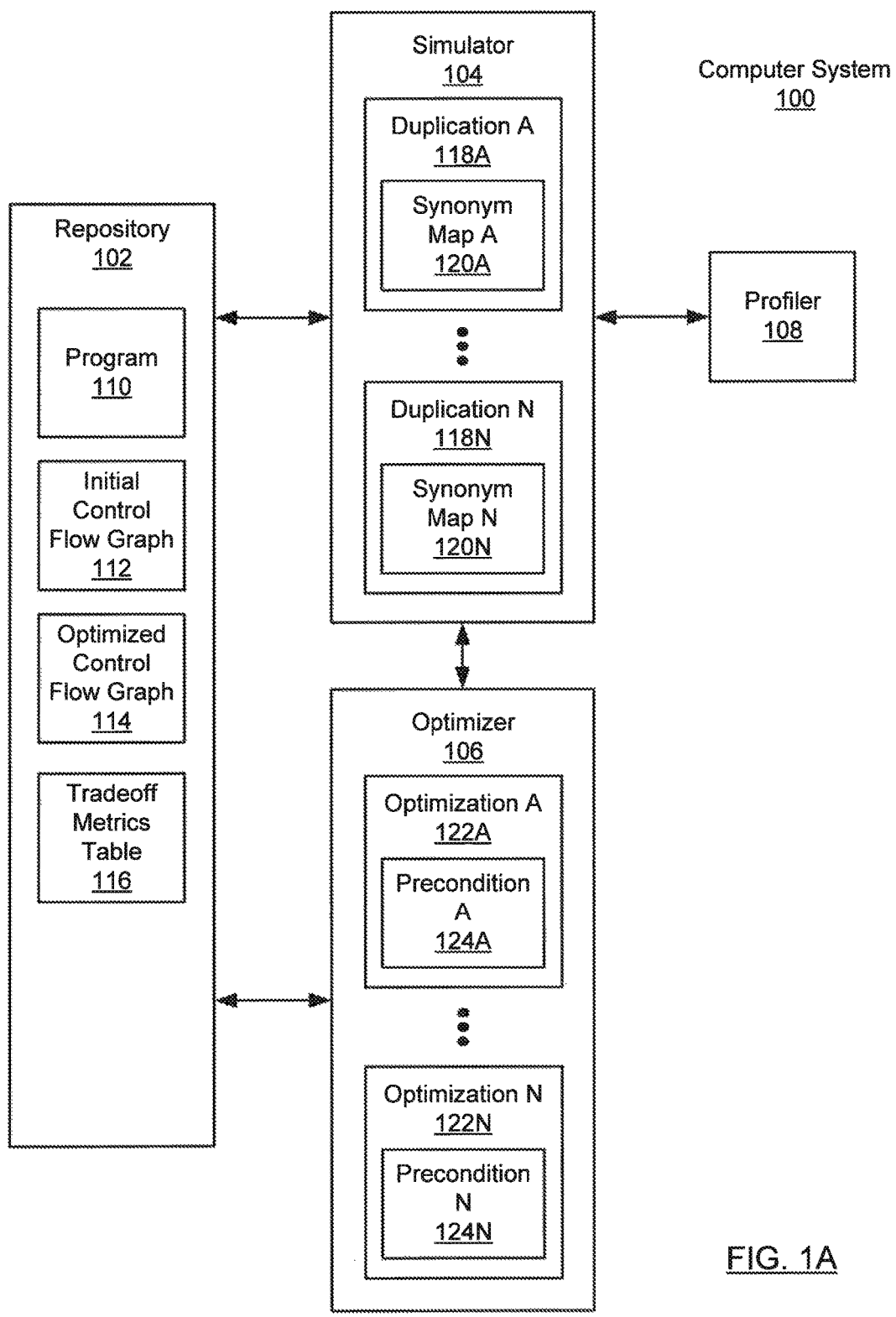
FIG. 1A, FIG. 1B, and FIG. 1C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to optimizing a program by duplicating code blocks. In one or more embodiments, code blocks to be duplicated occur at control flow merges, enabling optimization of merge blocks in the context of specific predecessor blocks (e.g., code blocks preceding the merge point). In one or more embodiments, duplication of a merge block is first simulated (e.g., by inserting the merge block within copies of predecessor blocks), so that only duplications resulting in desired benefits are ultimately performed. In one or more embodiments, a merge block is duplicated when the benefits of duplication (e.g., in terms of improved runtime and/or compile-time performance due to the application of various optimizations) outweigh the cost of duplication (e.g., in terms of expanded code size). The decision to duplicate a merge block in a predecessor block may also be based on the probability of executing the predecessor block. In one or more embodiments, a tradeoff function that determines the applicability of an optimization also evaluates the benefit resulting from applying the optimization.

FIG. 1A shows a computer system (100) in accordance with one or more embodiments of the invention. As shown in FIG. 1A, the computer system (100) includes a repository (102), a simulator (104), an optimizer (106), and a profiler (108). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a program (110), an initial control flow graph (CFG) (112), an optimized control flow graph (114), and a tradeoff metrics table (116). In one or more embodiments, the program (110) is any collection of source code including various software components. That is, the program (110) may be any collection of computer instructions written in a human-readable programming language. The program (110) may be transformed by a compiler into binary machine code. Compiled machine code may then be executed by a processor (e.g., contained in computer system (100)) in order to execute the software components generated from the program (110).

Figure 1B:
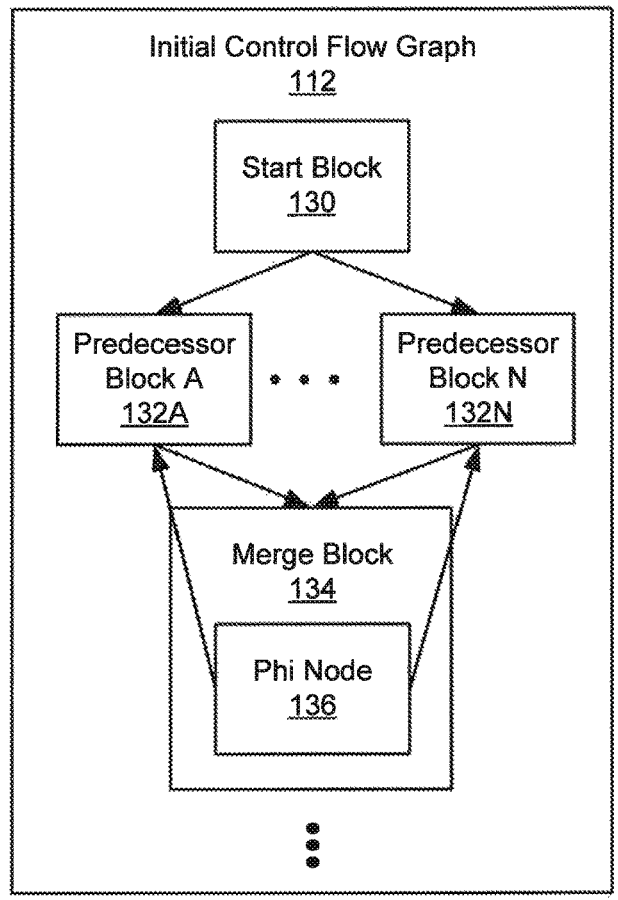
Figure 1B:
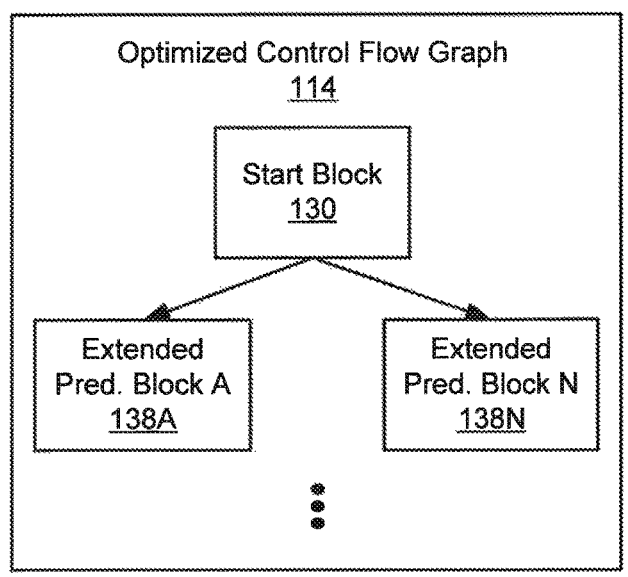

In one or more embodiments, the initial control flow graph (112) and the optimized control flow graph (114) are representations of the program (110) that may be compiled into executable machine code. As shown in FIG. 1B, in one or more embodiments, the initial control flow graph (112) includes a start block (130), predecessor blocks (132A, 132N), and a merge block (134). In one or more embodiments, the start block (130), predecessor blocks (132A, 132N), and the merge block (134) each include a collection of nodes, where each node corresponds to an element of the program (110). For example, the element may be: a variable, a constant, a statement, an expression, a function, a function invocation, etc.

In one or more embodiments, a variable may be a symbol (e.g., 'x', 'y', 'input', 'result') that references a location in the program (110) where a value is stored, such as an allocation site. In one or more embodiments, a variable may be a field of an object. An allocation site may be a statement in the program (110) that declares, instantiates, and/or initializes an object. In one or more embodiments, the allocation site may refer to a location in a memory (e.g., a heap memory) of the computer system (100) that is allocated when the program (110) is executed.

When the program (110) is executed, execution may proceed linearly within the start block (130), until a control flow branch is reached, after which control passes to one of the predecessor blocks (132A, 132N) (e.g., depending on a value of an expression). For example, the start block (130) may include a representation of a conditional statement, such as an if statement, and the predecessor blocks (132A, 132N) may represent the true and false branches. As another example, the conditional statement may be a switch statement, followed by any number of predecessor blocks (132A, 132N). After a predecessor block (132A, 132N) is executed, control may then be passed to the merge block (134). In one or more embodiments, there is a merge block (134) corresponding to each control flow branch of the initial control flow graph (112).

Returning to FIG. 1A, in one or more embodiments, the initial control flow graph (112) is represented in static single assignment (SSA) form. In one or more embodiments, using static single assignment, the variables represented in the initial control flow graph (112) may be renamed such that each variable is assigned exactly once, and each variable is defined before it is used. For example, if it is possible to assign a variable x using a value coming from multiple predecessor blocks (132A, 132N), then the variable x may be split into versions that are named $x_1, x_2, \ldots x_n$ to correspond with the various ways that x may be assigned a single value (i.e., exactly once). In this way each assignment of the variable x corresponds to its own version $x_i$. In one or more embodiments, the application of optimizations (122A, 122N) to the initial control flow graph (112) is facilitated by requiring that each variable represented in the initial control flow graph (112) be assigned exactly once (e.g., if a variable could be assigned more than once, then an optimization that includes the variable (122A, 122N) might not be consistent with each possible assignment). In one or more embodiments, the initial control flow graph (112) is not initially represented in SSA form, but may be converted to SSA form on demand (e.g., at runtime).

Returning to FIG. 1B, in one or more embodiments, the merge block (134) includes a phi node (136) that references a value provided by each of the predecessor blocks (132A, 132N) that precedes the merge block (134) and follows the start block (130). For example, the merge block (134) may receive data values provided by various predecessor blocks (132A, 132N), depending on which control flow branch is taken at runtime. The phi node (136) may function as a placeholder in the initial control flow graph (112) indicating a variable may be assigned a value provided by one of several predecessor blocks (132A, 132N).

In FIG. 1B, control flows are indicated with downward arrows (e.g., from the start block (130) to the predecessor blocks (132A, 132N), and from the predecessor blocks (132A, 132N) to the merge block (134)), whereas data flows are indicated with upward arrows (e.g., from the phi node (136) to the predecessor blocks (132A, 132N)).

Returning to FIG. 1A, in one or more embodiments, the simulator (104) may be implemented in hardware (e.g., circuitry), software, firmware, and/or any combination thereof. In one or more embodiments, the simulator (104) includes functionality to simulate a duplication (118A, 118N) of a predecessor-merge pair that includes a predecessor block (132A, 132N) and a merge block (134). That is, the duplication (118A, 118N) of the predecessor-merge pair may simulate the insertion of a copy of the merge block (134) within the predecessor block (132A, 132N) to give the appearance of a single contiguous block called an extended predecessor block. In one or more embodiments, the extended predecessor block represents (e.g., simulates) the result of appending a copy of the merge block (134) to the predecessor block (132A, 132N).

Returning to FIG. 1B, in one or more embodiments, simulating the duplication (118A, 118N) of the predecessor-merge pair permits the application of optimizations (122A, 122N) that are otherwise infeasible (e.g., due to the difficulty of applying optimizations (122A, 122N) across block boundaries). In one or more embodiments, the extended predecessor block may be optimized as a single compilation unit. For example, simulating insertion of the merge block (134) within an extended predecessor block permits an operand (e.g., a variable) of the merge block (134) to be specialized (i.e., optimized) using one or more values of the predecessor block (132N). For example, if the extended predecessor block corresponds to a false branch of an if statement, then the false Boolean value may be propagated to the merge block (134), along with any other values that depend on the Boolean value.

In one or more embodiments, by simulating a duplication of the predecessor-merge pair, the merge block (134) within the extended predecessor block becomes dominated by the predecessor block (132A, 132N). That is, the code in the merge block (134) may be reached only by executing the predecessor block (132A, 132N) (e.g., any execution path to the merge block (134) must also go through the predecessor block (132A, 132N)). In other words, the predecessor block (132A, 132N) may provide the values needed by any phi node (136) within the (dominated) merge block (134). In one or more embodiments, the duplication (118A, 118N) includes a synonym map (120A, 120N). The synonym map (120A, 120N) may be used to map the phi node (136) of the merge block (134) to a node in each predecessor block (132A, 132N) that corresponds to the merge block (134).

Returning to FIG. 1A, in one or more embodiments, the optimizer (106) may be implemented in hardware (e.g., circuitry), software, firmware, and/or any combination thereof. In one or more embodiments, the optimizer (106) includes functionality to apply optimizations (122A, 122N) locally to an extended predecessor block corresponding to a duplication (118A, 118N) of the predecessor-merge pair. In one or more embodiments, the optimizer (106) includes functionality to evaluate a benefit of applying optimizations (122A, 122N) to the duplication (118A, 118N) of the predecessor-merge pair. For example, the benefit may result in reduced resource requirements (e.g., processor cycles, memory), reduced code size, reduced number of input/output operations, and/or minimizing or maximizing any attribute of the performance of the computer system (100). Examples of optimizations (122A, 122N) may include: constant folding, conditional elimination, escape analysis, scalar replacement, read elimination, strength reduction, etc. In one or more embodiments, the optimizations (122A, 122N) may be obtained from a library of compiler optimizations (e.g., specific to a language and/or compiler).

In one or more embodiments, each optimization (122A, 122N) includes a precondition (124A, 124N). In one or more embodiments, the precondition (124N) is a condition that must be satisfied (e.g., by the duplication (118A, 118N) of the predecessor-merge pair, or by the initial control flow graph (112)) before the corresponding optimization (124N) may be applied. In one or more embodiments, a function that evaluates the precondition (124N) may estimate the benefit resulting from applying the corresponding optimization (124N). For example, evaluating the precondition (124N) may include estimating the number of nodes added or removed when the corresponding optimization (124N) is applied.

In one or more embodiments, the optimizer (106) includes functionality to apply optimizations (122A, 122N) to an initial control flow graph (112) to generate an optimized control flow graph (114). Returning to FIG. 1B, in one or more embodiments, the optimized control flow graph (114) includes the start block (130) and extended predecessor blocks (138A, 138N). That is, the optimized control flow graph (114) of FIG. 1B illustrates the scenario where the merge block (134) has been duplicated in each predecessor block (132A, 132N) to form extended predecessor blocks (138A, 138N). In an alternate scenario, the merge block (134) may not be duplicated in each predecessor block (132A, 132N). For example, it may be determined that the cost of duplicating the merge block (134) within one or more predecessor blocks (132A, 132N) is too high, in which case the optimized control flow graph (114) may retain the merge block (134) and one or more predecessor blocks (132A, 132N) of the initial control flow graph (112).

Figure 1C:
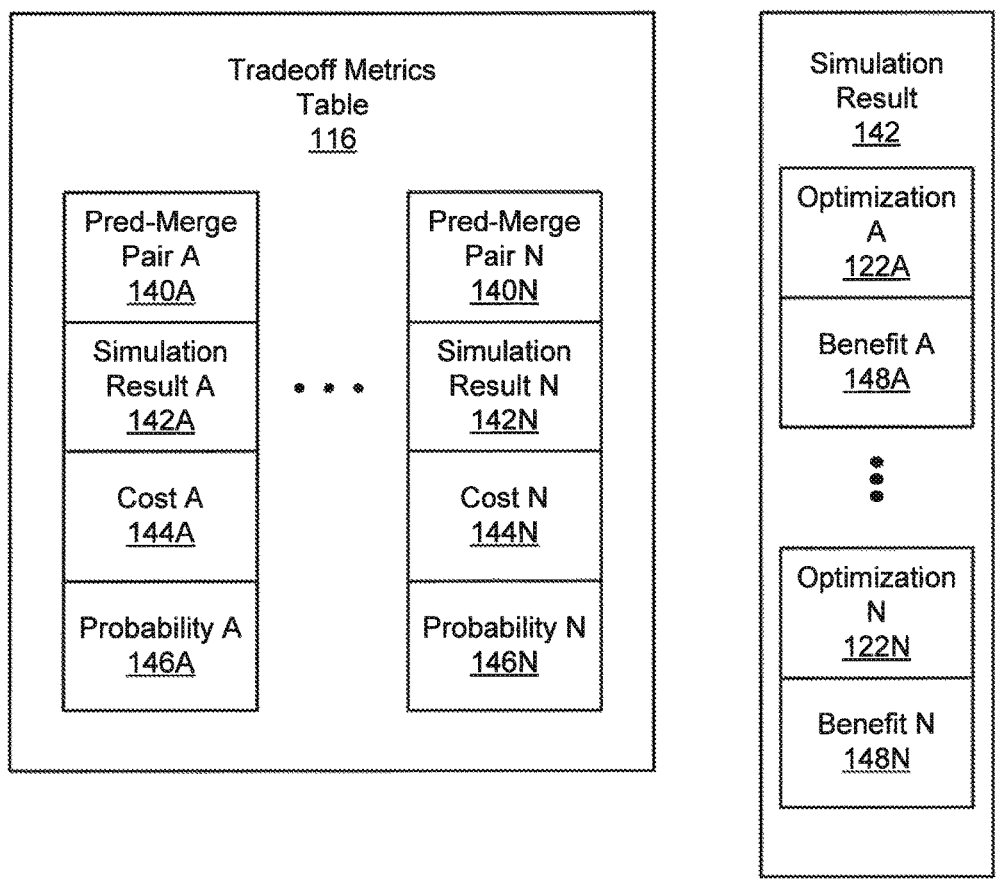

In one or more embodiments, the simulator (104) includes functionality to generate a tradeoff metrics table (116). As shown in FIG. 1C, in one or more embodiments, each entry in the tradeoff metrics table (116) includes a predecessor-merge pair (140A, 140N), a simulation result (142A, 142N), a cost (144A, 144N), and a probability (146A, 146N). In one or more embodiments, the predecessor-merge pair (140A, 140N) includes a predecessor block (132A, 132N) and a merge block (134). In one or more embodiments, the predecessor-merge pair (140A, 140N) corresponds to an extended predecessor block (e.g., (138A, 138N) of FIG. 1B).

In one or more embodiments, each simulation result (142) indicates the benefits (148A, 148N) gained by applying optimizations (122A, 122N) to the duplication (118A, 118N) corresponding to the predecessor-merge pair (140A, 140N).

In one or more embodiments, the simulator (104) includes functionality to determine the cost (144A, 144N) of duplicating a predecessor-merge pair (140A, 140N). In one or more embodiments, the cost (144A, 144N) may be increased code size (e.g., due to inserting a copy of the merge block (134) in the predecessor block (132A, 132N)). Alternatively or additionally, the cost (144A, 144N) may be decreased performance resulting from increased compile-time and/or runtime processing (e.g., cache misses due to a larger or more complex control flow graph).

In one or more embodiments, the probability (146A, 146N) indicates the likelihood that the predecessor block (132A, 132N) corresponding to the predecessor-merge pair (140A, 140N) will be executed. In one or more embodiments, each predecessor block (132A, 132N) corresponds to a branch in the program (110), where the branch has an associated probability of being selected at runtime. For example, the probability (146A, 146N) may be based on an analysis of the runtime behavior of the program (110).

Returning to FIG. 1A, in one or more embodiments, the profiler (108) may be implemented in hardware (e.g., circuitry), software, firmware, and/or any combination thereof. In one or more embodiments, the profiler (108) includes functionality to assign the probability (146A, 146N) of executing a predecessor block (132A, 132N) (e.g., by performing an analysis of the runtime behavior of the program (110)). For example, if the probability (146A, 146N) of executing a predecessor block (132A, 132N) is low, then there may be marginal value in duplicating and then optimizing the predecessor-merge pair (140A, 140N) corresponding to the predecessor block (132A, 132N).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
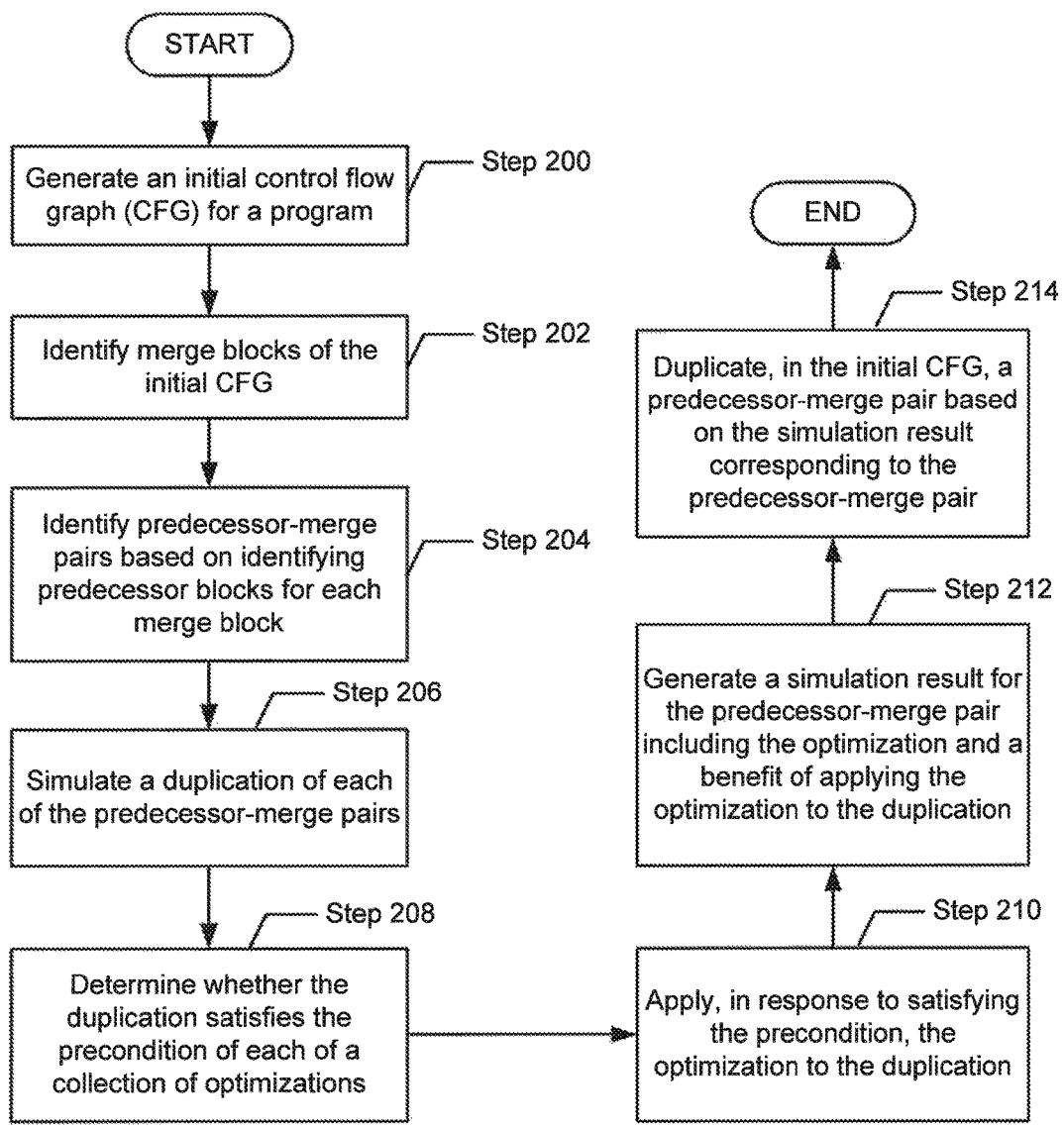
FIG. 2 and FIG. 3 show flowcharts in accordance with one or more embodiments of the invention.

FIG. 2 shows a flowchart in accordance with one or more embodiments of the invention. The flowchart depicts a process for analyzing a program. One or more of the steps in FIG. 2 may be performed by the components (e.g., the document simulator (104) and/or the optimizer (106)) of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, an initial control flow graph (CFG) for the program is generated. The program may be any collection of source code. The program may be obtained from a repository. In one or more embodiments, the initial control flow graph is a representation of the program that may be compiled into executable machine code. The initial control flow graph may include a start block, predecessor blocks, and a merge block. Each block may include a collection of nodes, where each node corresponds to an element (e.g., variable, constant, statement, expression, function invocation, etc.) of the program. When the program is executed, execution may proceed linearly within the start block, until a control flow branch is reached, after which control passes to one of the predecessor blocks. For example, the start block may include a representation of an if statement, and the predecessor blocks may represent the true and false branches. After a predecessor block is executed, control may then be passed to the merge block.

In one or more embodiments, the variables represented in the initial control flow graph may be renamed such that each variable is assigned exactly once. For example, if it is possible to assign a given variable x with a value coming from multiple predecessor blocks, then the variable x may be split into versions that are named $x_1, x_2, \ldots x_n$ to correspond with the various ways that x may be assigned a single value.

In one or more embodiments, the merge block includes a phi node that references a value provided by each of the predecessor blocks that precedes the merge block. The phi node may function as a placeholder in the initial control flow graph that indicates a variable may be assigned a value provided by one of several predecessor blocks (e.g., depending on which control flow branch is taken at runtime).

In Step 202, merge blocks of the initial control flow graph are identified. In one or more embodiments, the merge blocks of the initial control flow graph may be identified by traversing the initial control flow graph and noting the merge block corresponding to each control flow branch of the initial control flow graph. For example, the merge block may follow each predecessor block corresponding to the control flow branch.

In Step 204, predecessor-merge pairs are identified based on identifying predecessor blocks for each merge block identified in Step 202 above. In one or more embodiments, the predecessor-merge pairs may be identified by traversing the initial control flow graph and noting the predecessor blocks corresponding to each merge block.

In Step 206, a duplication of each predecessor-merge pair is simulated. In one or more embodiments, simulating duplication of each predecessor-merge pair simulates appending the merge block of the predecessor-merge pair to the predecessor block of the predecessor-merge pair to form a single contiguous extended predecessor block.

In one or more embodiments, by simulating duplication of the merge block within the predecessor block, the merge block appears to be dominated by the predecessor block. In other words, the predecessor block provides the values for any phi nodes within the merge block. In one or more embodiments, simulating duplication of the merge block within the predecessor block removes the boundary between the merge block and the predecessor block, thereby permitting optimizations to be applied to the extended predecessor block as a single unit. The impact of various optimizations may later (e.g., in Step 210 below) be evaluated relative to the simulated duplication (e.g., without modifying the initial control flow graph).

In one or more embodiments, the simulated duplications are generated during the traversal (e.g., depth-first traversal) of the initial control flow graph. In one or more embodiments, the simulated duplications are generated during the traversal of a dominator tree for the program. In one or more embodiments, a dominator tree is a tree where each node n's children are the nodes immediately dominated by node n. In one or more embodiments, a node n immediately dominates a node x when there is no other node q that dominates node x in a path between node n and node x.

In one or more embodiments, each time a new predecessor block is encountered, the current traversal is paused and a duplication simulation traversal is begun, where duplication of the merge block corresponding to the new predecessor block is simulated to form a new extended predecessor block. The duplication simulation traversal may reuse the context of the paused traversal (e.g., in order to avoid unnecessary copying during the duplication simulation traversal).

In one or more embodiments, the merge block of the predecessor-merge pair includes a phi node that that references nodes (e.g., values) in multiple predecessor blocks. In one or more embodiments, instead of replacing the phi node with a node in the predecessor block, a synonym map is used (e.g., when determining whether the duplication satisfies the precondition of an optimization in Step 208 below) to map the phi node to the node in the predecessor block. That is, each simulated duplication may have its own synonym map to resolve a phi node to the appropriate node in the predecessor block.

In Step 208, it is determined whether the duplication satisfies the precondition of each of a collection of optimizations. For example, the precondition may determine whether a specific pattern of nodes is present within the extended predecessor block in the simulated duplication. The collection of optimizations may include: constant folding, conditional elimination, escape analysis, scalar replacement, read elimination, etc. In one or more embodiments, the optimizations may be obtained from a library of compiler optimizations. In one or more embodiments, the precondition is evaluated by a function. In one or more embodiments, the function accepts the synonym map as an argument (e.g., to resolve a phi node to the appropriate value in the extended predecessor block).

In Step 210, in response to satisfying the precondition, the optimization is applied to the duplication of the predecessor-merge pair. In one or more embodiments, the optimization is applied locally to the extended predecessor block. In one or more embodiments, the optimization may add and/or remove nodes from the duplication. In one or more embodiments, the synonym map may be used to map an added node to an existing node of the duplication. For example, an optimization may replace a multiplication operation with a register shift operation, where an added node corresponding to the register shift operation is mapped by the synonym map to an existing node corresponding to the multiplication operation.

In Step 212, a simulation result for the predecessor-merge pair corresponding to the duplication is generated. In one or more embodiments, the simulation result includes the optimization and a benefit of applying the optimization to the duplication. In one or more embodiments, the benefit may be a peak performance increase. Alternatively, the benefit may be reduced resources (e.g., processor cycles, memory), reduced size of the duplication, reduced number of input/output operations, and/or minimizing or maximizing any attribute of the performance of the computer system. In one or more embodiments, the benefit may be based on a number of nodes added to or removed from the duplication. For example, the benefit may be based on replacing a computationally expensive operation (e.g., multiplication or division) with a simpler operation (e.g., a register shift). In one or more embodiments, the benefit is determined by a function that determines whether the precondition of the optimization is satisfied in Step 208 above.

In one or more embodiments, the simulation result for the predecessor-merge pair includes the benefit of applying each optimization whose corresponding precondition is satisfied by the duplication in Step 208 above. In one or more embodiments, the simulation result for the predecessor-merge pair is stored in the tradeoff metrics table (e.g., where the tradeoff metrics table may be referenced in Step 214 below).

In Step 214, a predecessor-merge pair is duplicated, in the initial control flow graph, based on the simulation result corresponding to the predecessor-merge pair. In one or more embodiments, the predecessor-merge pair is duplicated when the aggregate benefits of the optimizations included in the simulation result corresponding to the predecessor-merge pair exceed a predetermined threshold value. For example, if two optimizations have been applied to the duplication corresponding to the predecessor-merge pair, and the benefit of applying the optimizations are a savings of 10 processor cycles and 7 processor cycles, respectively, then the aggregate benefit of applying the optimizations for the predecessor-merge pair is a savings of 17 processor cycles.

In one or more embodiments, if the aggregate benefit is below a predetermined threshold value, then the duplication may be discarded, the corresponding duplication simulation traversal may be aborted, and the previously paused traversal may be resumed.

In one or more embodiments, a heuristic may be applied to the duplication (e.g., when determining whether the precondition of an optimization is satisfied in Step 208 above) to determine whether to abort the corresponding duplication simulation traversal. For example, the heuristic may be based on detecting a pattern or structural property in the duplication.

Figure 3:
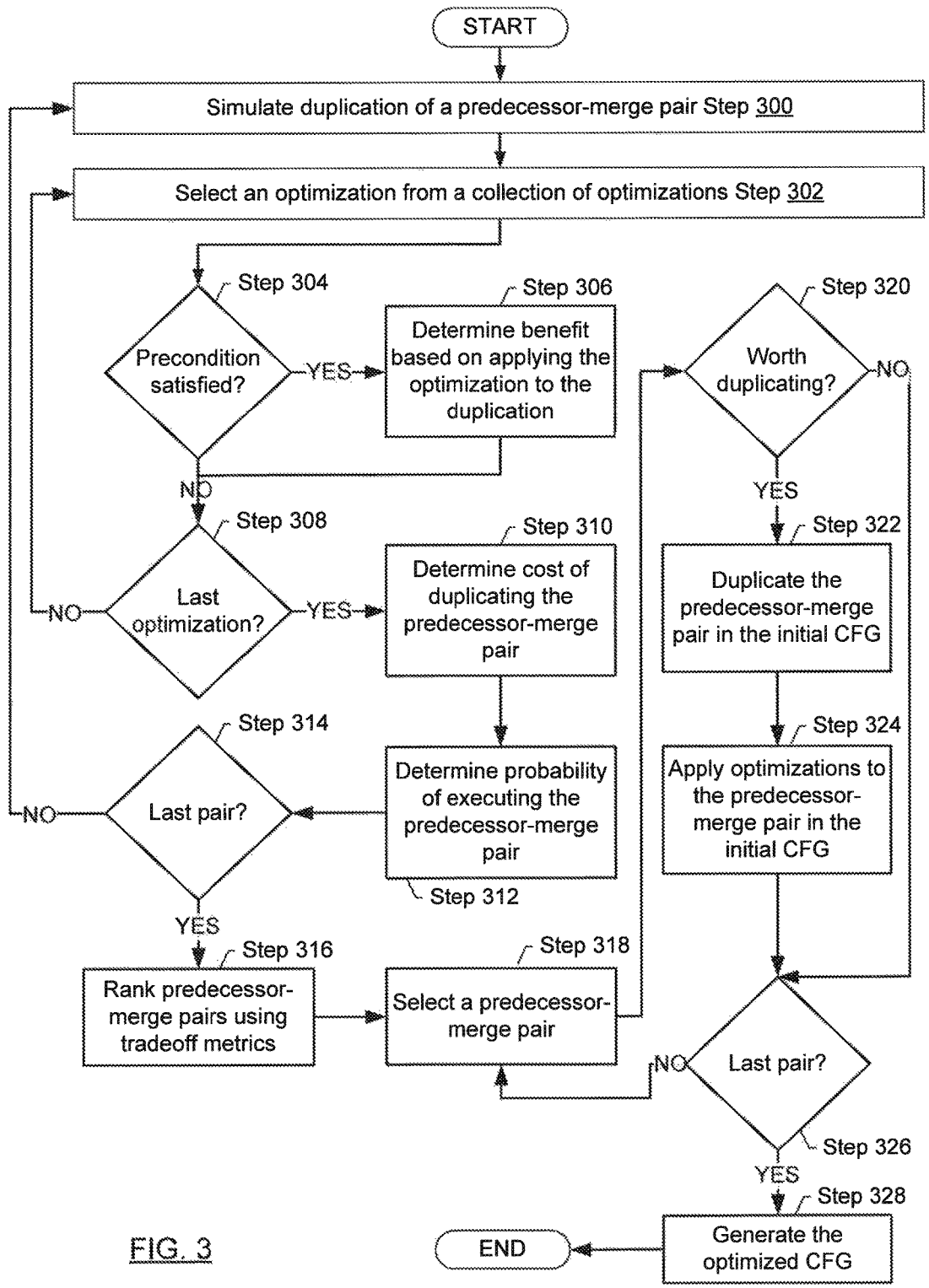

FIG. 3 shows a flowchart in accordance with one or more embodiments of the invention. The flowchart depicts a process for analyzing a program. Moreover, the flowchart in FIG. 3 may correspond to Step 206, Step 208, Step 210, Step 212, and Step 214 in FIG. 2. One or more of the steps in FIG. 3 may be performed by the components (e.g., the document simulator (104), the optimizer (106) and/or the profiler (108)) of the computer system (100), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a duplication of a predecessor-merge pair is simulated (see description of Step 206 above).

In Step 302, an optimization is selected from a collection of optimizations (see description of Step 208 above).

If, in Step 304, it is determined that the duplication satisfies the precondition of the selected optimization (see description of Step 208 above), then in Step 306, the benefit of applying the selected optimization to the duplication is determined (see descriptions of Step 210 and Step 212 above).

If, in Step 308, it is determined that the selected optimization is the last optimization in the collection of optimizations, then Step 310 below is executed. Otherwise, if there are one or more additional optimizations (i.e., not yet selected for the predecessor-merge pair) in the collection of optimizations, then Step 302 above is performed to select another optimization in the collection of optimizations.

In Step 310, a cost of duplicating the predecessor-merge pair is determined. In one or more embodiments, the cost may be increased size of (e.g., in terms of a number of nodes added to) the control flow graph (e.g., due to duplicating the merge block in the predecessor block corresponding to the predecessor-merge pair). Alternatively or additionally, the cost may be decreased reduced performance resulting from increased compile-time and/or runtime processing (e.g., due to a larger or more complex control flow graph). In one or more embodiments, the cost of duplicating the predecessor-merge pair is stored in the tradeoff metrics table.

In Step 312, a probability of executing the predecessor-merge pair is determined. In one or more embodiments, the predecessor block of the predecessor-merge pair corresponds to a branch in the program, where the branch has an associated probability of being selected at runtime. For example, the probability may be based on an analysis of the runtime behavior of the program. In one or more embodiments, the probability of executing the predecessor-merge pair is stored in the tradeoff metrics table.

If, in Step 314, it is determined that the predecessor-merge pair is the last predecessor-merge pair (e.g., all predecessors of the merge block of the predecessor-merge pair have already been selected in an iteration of Step 300 above), then Step 316 below is executed. Otherwise, if there are one or more additional predecessor-merge pairs to examine, then Step 300 above is performed to simulate duplication of another predecessor-merge pair.

In Step 316, the predecessor-merge pairs are ranked using tradeoff metrics. For example, the predecessor-merge pairs may be sorted first by simulation results (e.g., benefits), then by cost, then by probability. In one or more embodiments, the predecessor-merge pairs are ranked based on a tradeoff function that is applied to the values of the tradeoff metrics for each predecessor-merge pair. The tradeoff function may be designed to favor specific types of optimizations and/or to achieve specific goals (e.g., reduced code size, reduced memory allocation, increased compile-time performance, increased run-time performance, etc.). For example, the tradeoff function may apply weights to each of the tradeoff metrics (e.g., benefit, cost, and probability). In one or more embodiments, the tradeoff function is configurable. For example, the weights used by the tradeoff function may be configured by a user of the computer system.

In Step 318, a predecessor-merge pair is selected, using the ranking of Step 316 above. For example, the predecessor-merge pair with the greatest benefit may be selected. As another example, the predecessor-merge pair with the highest value of the tradeoff function may be selected.

If, in Step 320, it is determined that the predecessor-merge pair is worth duplicating, then Step 322 below is executed. Otherwise, if it is determined that the predecessor-merge pair is not worth duplicating, then Step 326 below is performed. In one or more embodiments, the determination that predecessor-merge pair is worth duplicating is based on the benefit associated with the predecessor-merge pair exceeding a predetermined threshold value. In one or more embodiments, the determination that predecessor-merge pair is worth duplicating is based on the value of the tradeoff function associated with the predecessor-merge pair exceeding a predetermined threshold value.

In one or more embodiments, the determination that predecessor-merge pair is worth duplicating is based on a budget for the initial control flow graph. For example, the budget may set a limit on the percentage by which the estimated size of the initial control flow graph may increase (e.g., the limit may be a 50% estimated size increase), in order to avoid a significant increase to the workload of a compiler. If the estimated size increase of the initial control flow graph due to duplicating the predecessor-merge pair exceeds the budget, then it may be determined that the predecessor-merge pair is not worth duplicating. In one or more embodiments, the budget is set by the computer system (e.g., the budget may be set by a virtual machine executing on the computer system).

In Step 322, the selected predecessor-merge pair is duplicated in the initial control flow graph (see description of Step 214 above). In one or more embodiments, the budget for the initial control flow graph may be decreased by the estimated size increase of the initial control flow graph due to duplicating the predecessor-merge pair (i.e., the budget may shrink each time a predecessor-merge pair is duplicated).

In Step 324, optimizations are applied to the selected predecessor-merge pair in the initial control flow graph. In one or more embodiments, the optimizations included in the simulation result corresponding to the selected predecessor-merge pair are applied locally to the extended predecessor block corresponding to the selected predecessor-merge pair.

If, in Step 326, it is determined that the predecessor-merge pair is the last predecessor-merge pair (e.g., all predecessors of the merge block of the predecessor-merge pair have already been selected in an iteration of Step 318 above), then Step 328 below is executed. Otherwise, if there are one or more additional predecessor-merge pairs to examine, then Step 318 above is performed to select another predecessor-merge pair as a possible candidate for duplication.

In Step 328, an optimized control flow graph is generated. In one or more embodiments, the optimized control flow graph is the initial control flow graph after the duplications of Step 322 above and the optimizations of Step 324 above have been performed.

In one or more embodiments, after the optimized control flow graph is generated in Step 328 above, the flowchart of FIG. 3 is again executed using the optimized control flow graph, starting with Step 300 above (i.e., where Step 300 is performed relative to the optimized control flow graph instead of the initial control flow graph). For example, some optimizations may be applicable to the optimized control flow graph that were not applicable to the initial control flow graph.

Figure 4A:
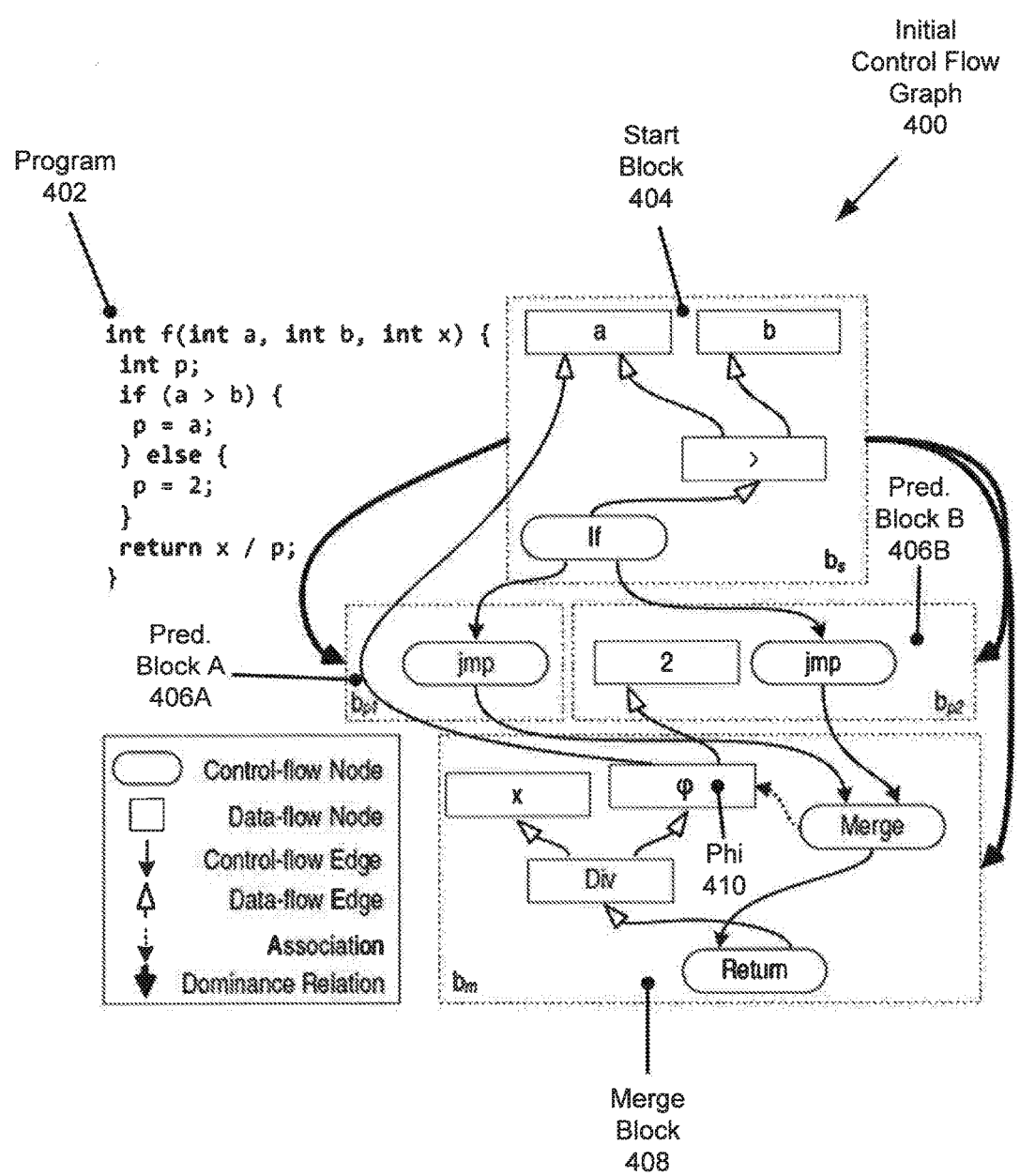
FIG. 4A, FIG. 4B, and FIG. 4C show examples in accordance with one or more embodiments of the invention.
Figure 4B:
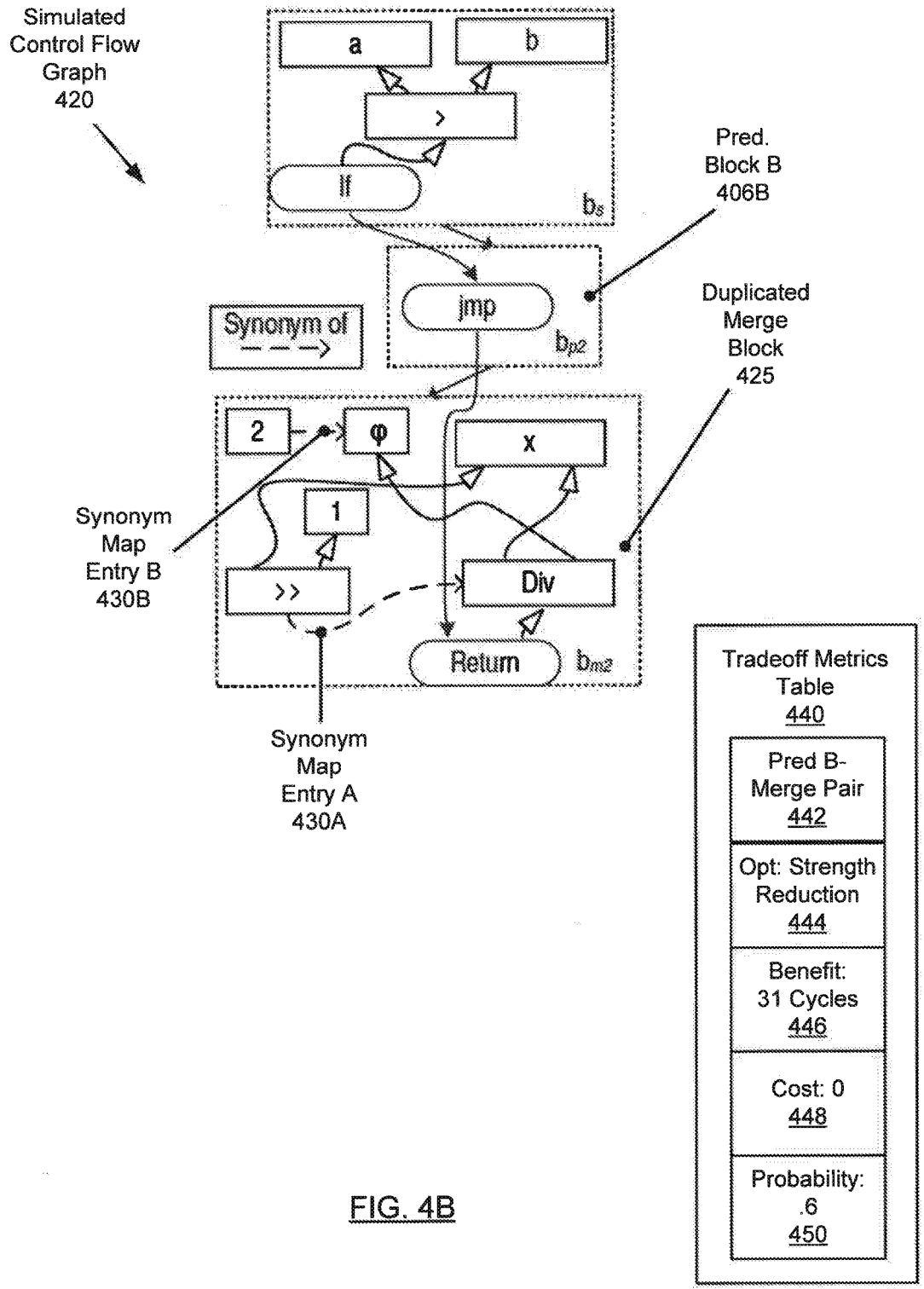
Figure 4C:
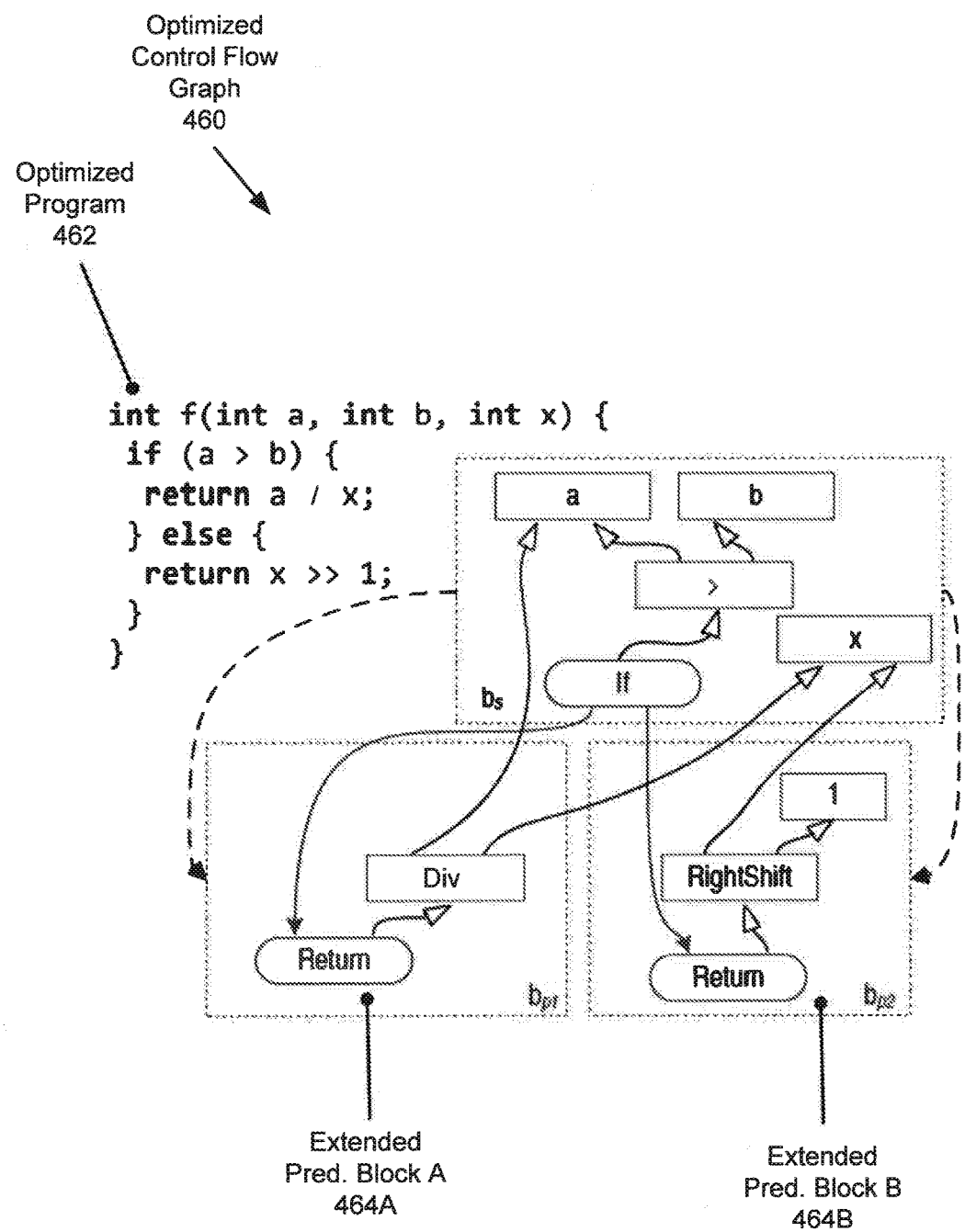

The following example is for explanatory purposes only and not intended to limit the scope of the invention. FIG. 4A, FIG. 4B, and FIG. 4C show an implementation example in accordance with one or more embodiments of the invention.

Initially, the simulator (104) generates an initial control flow graph (400) for a program (402), as shown in FIG. 4A. The initial control flow graph (400) includes a start block (404), predecessor blocks (406A, 406B), and a merge block (408). Predecessor block A (406A) corresponds to the true branch of the if statement of the start block (404), and predecessor block B (406B) corresponds to the false branch of the if statement. The initial control flow graph (400) includes a phi ($\varphi$) node (410) that references variable a defined in the start block (404), where the value of variable a is accessible to each predecessor block (406A, 406B). The phi node (410) also references a constant 2 defined in predecessor block B (406B).

The simulator (104) then simulates duplication of the merge block (408) in each predecessor block (406A, 406B). The simulator (104) processes each simulated copy of the merge block (408) as if the merge block (408) is dominated by the respective predecessor block (406A, 406B) within a single contiguous block. FIG. 4B illustrates a simulated control flow graph (420) corresponding to the predecessor B-merge pair that includes predecessor block B (406B) and duplicated merge block (425). Because the predecessor block B (406B) dominates the duplicated merge block (425), the constant value 2 defined in predecessor block. B (406B) is propagated to the phi ($\varphi$) node in the duplicated merge block (425).

The simulator (104) then invokes the optimizer ((106) in FIG. 1A) to apply optimizations to the simulated control flow graph (420). The optimizer (106) iterates over the nodes of the duplicated merge block (425) and determines whether the precondition of each optimization is satisfied. The precondition for a strength reduction optimization is triggered relative to the division operation. For example, the precondition of the strength reduction optimization triggers whenever division by a power of 2 is detected. Therefore, the optimizer (106) applies the strength reduction optimization to the division operation and adds a shift (>>) operation corresponding to the statement x>>1, which shifts the value of the variable x to the right, by 1 bit, to achieve division by 2. The optimizer (106) then maps, via synonym map entry A (430A), the shift operation to the division operation, indicating that the shift operation is a synonym (i.e., replacement) for the division operation. This illustrates how the synonym map is updated as a result of applying an optimization. The optimizer (106) also maps, via synonym map entry B (430B), the phi node to the constant value 2 defined in predecessor block B (406B).

The optimizer (106) then estimates the benefit resulting from applying the strength reduction optimization. The optimizer (106) estimates that 32 processor cycles are required for the division operation, while only 1 processor cycle is required for the shift operation. Therefore, the optimizer (106) estimates the benefit associated with the strength reduction optimization to be 31 processor cycles saved. As shown in FIG. 4B, the optimizer (106) stores the benefit (446) in the tradeoff metrics table (440) associated with the strength reduction optimization (444) and the predecessor B-merge pair (442) corresponding to predecessor block B (406B) and the merge block (408).

The simulator (104) then performs a tradeoff analysis to determine whether the predecessor B-merge pair (442) is worth duplicating. The simulator (104) evaluates the cost (448) of duplicating the merge block (408) within predecessor block B (406B) in terms of a percentage code size increase, which in this case is the size of the merge block (408), which is duplicated in both predecessor blocks (406A, 406B). The simulator (104) also invokes the profiler ((108) in FIG. 1A) to determine the probability (450) of executing predecessor block B (406B), which in this case (e.g., based on analyzing the runtime behavior of program (402)) is 0.6. The simulator (104) decides that the predecessor B-merge pair (442) is worth duplicating because of a tradeoff rule that recommends duplicating a predecessor-merge pair when the benefit is greater than 5 processor cycles saved, the cost is less than a 50% code size increase, and the probability of executing the predecessor-merge pair exceeds 0.25. An alternative tradeoff rule may be to duplicate any predecessor-merge pair when the benefit exceeds 25 processor cycles saved, when the cost is less than a 100% code size increase, and the probability of executing the predecessor-merge pair exceeds 0.25.

The simulator (104) also performs a tradeoff analysis to determine whether the predecessor A-merge pair corresponding to predecessor block A (406A) and the merge block (408) is worth duplicating. The simulator (104) determines the benefit of reducing code size by applying an optimization that combines the assignment p=a in predecessor block A (406A) (as shown in the program (402) of FIG. 4A) with the return statement of the merge block (408).

However, the ultimate decision regarding whether to duplicate the predecessor A-merge pair corresponding to predecessor block A (406A) and the merge block (408) may depend on the decision whether to duplicate the predecessor B-merge pair corresponding to predecessor block B (406B) and the merge block (408). This is because duplicating the merge block (408) in one of the predecessor blocks may result in the domination of the original merge block by the other predecessor block. In other words, when there are only 2 predecessor blocks, the benefits of both duplications may need to be weighed against the cost of one of the duplications.

The simulator (104) then duplicates, in the initial control flow graph ((400) of FIG. 4A), the merge block (408) in both extended predecessor block A (464A) and extended predecessor block B (464B), as shown in the optimized control flow graph (460) of FIG. 4C. The simulator (104) then applies the optimizations that were applied to the predecessor-merge pairs by the optimizer (106). As shown in FIG. 4C, the division operation in extended predecessor block B (464B) has been replaced with a right shift operation, as a result of applying the strength reduction optimization. FIG. 4C also shows the optimized program (462) corresponding to the optimized control flow graph (460), where the statement x/p has been replaced with x>>1.

Figure 5A:
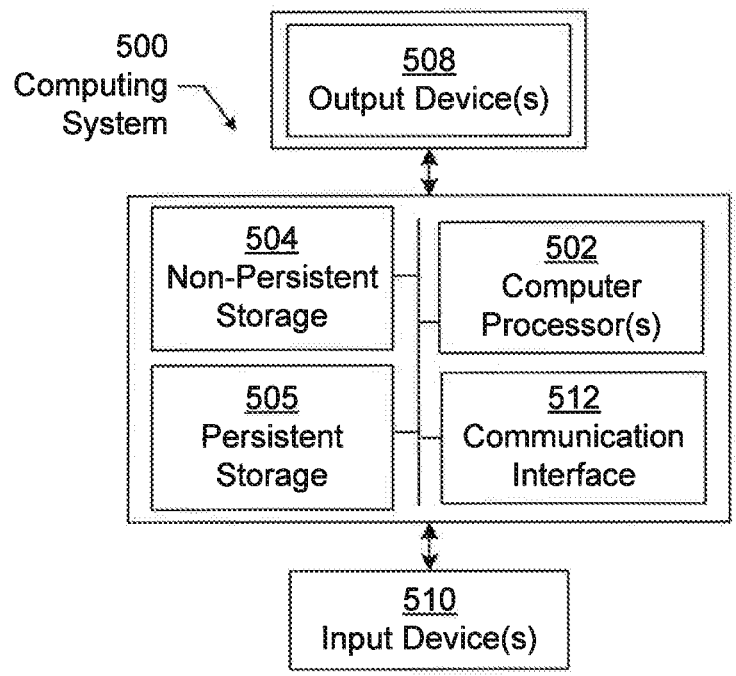
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
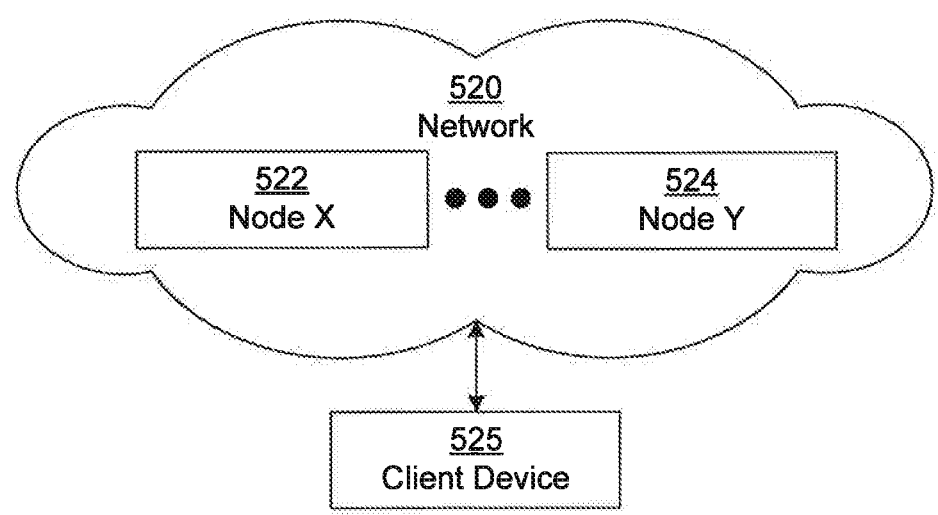

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIG. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a program, comprising:
generating an initial control flow graph (CFG) for the program;
identifying a plurality of merge blocks of the initial CFG;

identifying a plurality of predecessor-merge pairs based on identifying a plurality of predecessor blocks for each of the plurality of merge blocks;

simulating a duplication of each of the plurality of predecessor-merge pairs;

for each of a plurality of optimizations, each of the plurality of optimizations comprising a precondition:
  determining whether the duplication satisfies the precondition of the optimization;
  applying, in response to satisfying the precondition, the optimization to the duplication; and
  generating a simulation result for the predecessor-merge pair corresponding to the duplication, the simulation result comprising the optimization and a benefit of applying the optimization to the duplication; and duplicating, in the initial CFG, a predecessor-merge pair of the plurality of predecessor-merge pairs based on the simulation result corresponding to the predecessor-merge pair.

2. The method of claim 1, further comprising:
duplicating, in the initial CFG, a subset of the plurality of predecessor-merge pairs based on the simulation result corresponding to the predecessor-merge pair; and
generating an optimized CFG by applying, to the initial CFG, each optimization of the simulation result corresponding to each predecessor-merge pair of the subset.

3. The method of claim 1, wherein duplicating the predecessor-merge pair is further based on a cost of duplicating the predecessor-merge pair.

4. The method of claim 3, wherein duplicating the predecessor-merge pair is further based on determining that the cost of duplicating the predecessor-merge pair is within a budget for the initial CFG, the method further comprising:
  in response to duplicating the predecessor-merge pair, reducing the budget by the cost of duplicating the predecessor-merge pair.

5. The method of claim 1, wherein duplicating the predecessor-merge pair is further based on a probability of executing the predecessor-merge pair, the method further comprising:
  determining the probability using profiling information about the program indicating a frequency with which the predecessor-merge pair is executed.

6. The method of claim 1, wherein the initial CFG comprises a plurality of nodes, the method further comprising:
  inserting, into the plurality of nodes and prior to simulating the duplication, a phi node that references a node in each of the plurality of predecessor blocks corresponding to the merge block of the predecessor-merge pair, wherein the phi node is in the merge block of the predecessor-merge pair;
  creating a synonym map for the duplication; and
  adding, to the synonym map, an entry that maps the phi node to a node of a predecessor block corresponding to the merge block,
  wherein determining whether the duplication satisfies the precondition comprises mapping, using the synonym map, the phi node to the node of the predecessor block corresponding to the merge block.

7. The method of claim 6, further comprising:
  adding, in response to applying the optimization, an optimized node to the plurality of nodes; and
  adding, to the synonym map, an entry that maps the optimized node to a node of the plurality of nodes.

8. A system, comprising:
a repository configured to store a program, initial control flow graph (CFG), an optimized CFG, and a plurality of simulation results;
a memory coupled to a processor;
a simulator, executing on the processor and using the memory, configured to:
  generate the initial CFG for the program;
  identify a plurality of merge blocks of the initial CFG;
  identify a plurality of predecessor-merge pairs based on identifying a plurality of predecessor blocks for each of the plurality of merge blocks;
  simulate a duplication of each of the plurality of predecessor-merge pairs; and
  duplicate, in the initial CFG, a predecessor-merge pair of the plurality of predecessor-merge pairs based on a simulation result of the plurality of simulation results corresponding to the predecessor-merge pair; and
an optimizer, executing on the processor and using the memory, configured to:
  for each of a plurality of optimizations, each of the plurality of optimizations comprising a precondition:
    determine whether the duplication satisfies the precondition of the optimization;
    apply, in response to satisfying the precondition, the optimization to the duplication; and
    generate the simulation result of the plurality of simulation results for the predecessor-merge pair corresponding to the duplication, the simulation result comprising the optimization and a benefit of applying the optimization to the duplication.

9. The system of claim 8,
wherein the simulator is further configured to duplicate, in the initial CFG, a subset of the plurality of predecessor-merge pairs based on the simulation result corresponding to the predecessor-merge pair, and
wherein the optimizer is further configured to generate an optimized CFG by applying, to the initial CFG, each optimization of the simulation result corresponding to each predecessor-merge pair of the subset.

10. The system of claim 8, wherein duplicating the predecessor-merge pair is further based on a cost of duplicating the predecessor-merge pair.

11. The system of claim 10, wherein duplicating the predecessor-merge pair is further based on determining that the cost of duplicating the predecessor-merge pair is within a budget for the initial CFG, wherein the simulator is further configured to:
  in response to duplicating the predecessor-merge pair, reduce the budget by the cost of duplicating the predecessor-merge pair.

12. The system of claim 8,
wherein the system further comprises a profiler configured to determine a probability of executing the predecessor-merge pair using profiling information about the program indicating a frequency with which the predecessor-merge pair is executed, and
wherein duplicating the predecessor-merge pair is further based on the probability.

13. The system of claim 8, wherein the initial CFG comprises a plurality of nodes, wherein the simulator is further configured to:
  insert, into the plurality of nodes and prior to simulating the duplication, a phi node that references a node in each of the plurality of predecessor blocks corresponding to the merge block of the predecessor-merge pair, wherein the phi node is in the merge block of the predecessor-merge pair;

create a synonym map for the duplication; and add, to the synonym map, an entry that maps the phi node to a node of a predecessor block corresponding to the merge block, wherein determining whether the duplication satisfies the precondition comprises mapping, using the synonym map, the phi node to the node of the predecessor block corresponding to the merge block.

14. The system of claim 13, wherein the optimizer is further configured to:

add, in response to applying the optimization, an optimized node to the plurality of nodes; and add, to the synonym map, an entry that maps the optimized node to a node of the plurality of nodes.

15. A non-transitory computer readable medium comprising instructions that, when executed by a processor, perform a method for analyzing a program, the method comprising:

generating an initial control flow graph (CFG) for the program;

identifying a plurality of merge blocks of the initial CFG;

identifying a plurality of predecessor-merge pairs based on identifying a plurality of predecessor blocks for each of the plurality of merge blocks;

simulating a duplication of each of the plurality of predecessor-merge pairs;

for each of a plurality of optimizations, each of the plurality of optimizations comprising a precondition;

determining whether the duplication satisfies the precondition of the optimization;

applying, in response to satisfying the precondition, the optimization to the duplication; and generating a simulation result for the predecessor-merge pair corresponding to the duplication, the simulation result comprising the optimization and a benefit of applying the optimization to the duplication; and duplicating, in the initial CFG, a predecessor-merge pair of the plurality of predecessor-merge pairs based on the simulation result corresponding to the predecessor-merge pair.

16. The non-transitory computer readable medium of claim 15, the method further comprising:

duplicating, in the initial CFG, a subset of the plurality of predecessor-merge pairs based on the simulation result corresponding to the predecessor-merge pair; and generating an optimized CFG by applying, to the initial CFG, each optimization of the simulation result corresponding to each predecessor-merge pair of the subset.

17. The non-transitory computer readable medium of claim 15, wherein duplicating the predecessor-merge pair is further based on determining that a cost of duplicating the predecessor-merge pair is within a budget for the initial CFG, the method further comprising:

in response to duplicating the predecessor-merge pair, reducing the budget by the cost of duplicating the predecessor-merge pair.

18. The non-transitory computer readable medium of claim 15, wherein duplicating the predecessor-merge pair is further based on a probability of executing the predecessor-merge pair, the method further comprising:

determining the probability using profiling information about the program indicating a frequency with which the predecessor-merge pair is executed.

19. The non-transitory computer readable medium of claim 15, wherein the initial CFG comprises a plurality of nodes, the method further comprising:

inserting, into the plurality of nodes and prior to simulating the duplication, a phi node that references a node in each of the plurality of predecessor blocks corresponding to the merge block of the predecessor-merge pair, wherein the phi node is in the merge block of the predecessor-merge pair;

creating a synonym map for the duplication; and adding, to the synonym map, an entry that maps the phi node to a node of a predecessor block corresponding to the merge block, wherein determining whether the duplication satisfies the precondition comprises mapping, using the synonym map, the phi node to the node of the predecessor block corresponding to the merge block.

20. The non-transitory computer readable medium of claim 19, further comprising:

adding, in response to applying the optimization, an optimized node to the plurality of nodes; and adding, to the synonym map, an entry that maps the optimized node to a node of the plurality of nodes.

* * * * *

UNITED STATES PATENT AND TRADEMARK OFFICE
CERTIFICATE OF CORRECTION

PATENT NO. : 10,338,903 B2
APPLICATION NO. : 15/927852
DATED : July 2, 2019
INVENTOR(S) : Leopoldseder et al.

Page 1 of 1

It is certified that error appears in the above-identified patent and that said Letters Patent is hereby corrected as shown below:

In the Specification

In Column 1, Line 31, delete "teams" and insert -- terms --, therefor.

In Column 8, Line 56, delete "that that" and insert -- that --, therefor.

In Column 12, Line 1, delete "then." and insert -- then --, therefor.

In Column 12, Line 37, delete "4068)." and insert -- 406B). --, therefor.

In Column 12, Line 46, delete "block." and insert -- block --, therefor.

In Column 12, Line 46, delete "(4068)" and insert -- (406B) --, therefor.

Signed and Sealed this
Fourth Day of August, 2020

Andrei Iancu
*Director of the United States Patent and Trademark Office*